US012366653B2

(12) United States Patent
Keshipeddy

(10) Patent No.: US 12,366,653 B2
(45) Date of Patent: Jul. 22, 2025

(54) RADAR-BASED VEHICULAR EXTERIOR MIRROR COLLISION AVOIDANCE SYSTEM

(71) Applicant: Magna Electronics Inc., Auburn Hills, MI (US)

(72) Inventor: Prathyush Kumar Keshipeddy, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 402 days.

(21) Appl. No.: 18/049,391

(22) Filed: Oct. 25, 2022

(65) Prior Publication Data

US 2023/0128034 A1    Apr. 27, 2023

Related U.S. Application Data

(60) Provisional application No. 63/263,027, filed on Oct. 26, 2021.

(51) Int. Cl.
*B60R 1/062* (2006.01)
*B60Q 9/00* (2006.01)
*G01S 13/931* (2020.01)

(52) U.S. Cl.
CPC ............ *G01S 13/931* (2013.01); *B60Q 9/008* (2013.01); *B60R 1/062* (2013.01); *G01S 2013/9314* (2013.01)

(58) Field of Classification Search
CPC ........ G01S 13/93; G01S 13/931; G01S 13/88; B60Q 9/008; B60R 1/02; B60R 1/062
See application file for complete search history.

(56) References Cited

U.S. PATENT DOCUMENTS

| | | | |
|---|---|---|---|
| 6,204,753 B1 * | 3/2001 | Schenk | B60R 1/0625 340/932.2 |
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |
| 6,876,775 B2 | 4/2005 | Torunoglu | |
| 6,906,793 B2 | 6/2005 | Bamji et al. | |
| 6,919,549 B2 | 7/2005 | Bamji et al. | |
| 7,053,357 B2 | 5/2006 | Schwarte | |
| 7,157,685 B2 | 1/2007 | Bamji et al. | |
| 7,176,438 B2 | 2/2007 | Bamji et al. | |

(Continued)

*Primary Examiner* — Benyam Haile
(74) *Attorney, Agent, or Firm* — HONIGMAN LLP

(57) ABSTRACT

A vehicular sensing system includes at least one radar sensor disposed at a vehicle and capturing radar data, an electronic control unit (ECU) having a data processor for processing radar data captured by the at least one radar sensor to detect an object present exterior of the vehicle. The vehicular sensing system, during a parking maneuver of the equipped vehicle, responsive to processing by the data processor of radar data captured by the at least one radar sensor, determines the detected object is within a threshold distance of a predicted path of an exterior side mirror assembly of the vehicle. The vehicular sensing system, responsive to determining the object is within the threshold distance of the predicted path of the exterior side mirror assembly of the vehicle, automatically folds the exterior side mirror assembly toward the side of the vehicle.

19 Claims, 13 Drawing Sheets

(56) References Cited

U.S. PATENT DOCUMENTS

| | | |
|---|---|---|
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 8,874,317 B2 | 10/2014 | Marczok et al. |
| 9,036,026 B2 | 5/2015 | Dellantoni et al. |
| 9,068,390 B2 | 6/2015 | Ihlenburg et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,688,199 B2 | 6/2017 | Koravadi |
| 9,689,967 B1 | 6/2017 | Stark et al. |
| 9,753,121 B1 | 9/2017 | Davis et al. |
| 9,869,762 B1 | 1/2018 | Alland et al. |
| 9,954,955 B2 | 4/2018 | Davis et al. |
| 10,866,306 B2 | 12/2020 | Maher et al. |
| 11,124,113 B2 | 9/2021 | Singh |
| 12,030,513 B2 | 7/2024 | Bozich et al. |
| 2010/0245066 A1 | 9/2010 | Sarioglu et al. |
| 2015/0203038 A1* | 7/2015 | Haeussler ............... B60R 1/062 701/49 |
| 2015/0344028 A1 | 12/2015 | Gieseke et al. |
| 2017/0015312 A1 | 1/2017 | Latotzki |
| 2017/0017848 A1 | 1/2017 | Gupta et al. |
| 2017/0050672 A1 | 2/2017 | Gieseke et al. |
| 2017/0222311 A1 | 8/2017 | Hess et al. |
| 2017/0253237 A1 | 9/2017 | Diessner |
| 2017/0254873 A1 | 9/2017 | Koravadi |
| 2017/0276788 A1 | 9/2017 | Wodrich |
| 2017/0315231 A1 | 11/2017 | Wodrich |
| 2017/0317748 A1 | 11/2017 | Krapf |
| 2017/0329346 A1 | 11/2017 | Latotzki |
| 2017/0356994 A1 | 12/2017 | Wodrich et al. |
| 2018/0015875 A1 | 1/2018 | May et al. |
| 2018/0045812 A1 | 2/2018 | Hess |
| 2018/0231635 A1 | 8/2018 | Woehlte |
| 2019/0339382 A1 | 11/2019 | Hess et al. |
| 2022/0203896 A1* | 6/2022 | Choi ..................... B60R 1/062 |
| 2023/0032998 A1 | 2/2023 | Kushwaha et al. |

\* cited by examiner

RADAR-BASED VEHICULAR EXTERIOR MIRROR COLLISION AVOIDANCE SYSTEM

CROSS REFERENCE TO RELATED APPLICATION

The present application claims the filing benefits of U.S. provisional application Ser. No. 63/263,027, filed Oct. 26, 2021, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular sensing system includes at least one radar sensor disposed at a vehicle equipped with the vehicular sensing system and sensing exterior of the vehicle. The at least one radar sensor captures radar data. The system includes an electronic control unit (ECU) with electronic circuitry and associated software. The electronic circuitry of the ECU includes a data processor for processing radar data captured by the at least one radar sensor. During a parking maneuver of the equipped vehicle, radar data captured by the at least one radar sensor is processed at the ECU to detect an object present exterior of the vehicle. During the parking maneuver, the vehicular sensing system, responsive to processing by the data processor of radar data captured by the at least one radar sensor, determines that the detected object is within a threshold distance of a predicted path of an exterior side mirror assembly at a side of the vehicle. During the parking maneuver, the vehicular sensing system, responsive to determining the object is within the threshold distance of the predicted path of the exterior side mirror assembly of the vehicle, automatically folds the exterior side mirror assembly toward the side of the vehicle at which the exterior side mirror assembly is mounted.

These and other objects, advantages, purposes and features of the present invention will become apparent upon review of the following specification in conjunction with the drawings.

DESCRIPTION OF THE PREFERRED EMBODIMENTS

A vehicular sensing system and/or alert system operates to capture data representative of the exterior of the vehicle and may process the captured data to detect objects at or near the vehicle and in the predicted path of the vehicle, such as to assist a driver of the vehicle in maneuvering the vehicle in a forward or rearward direction. The sensing system includes a processor or processing system that is operable to receive sensor data from one or more sensors (e.g., radar sensors).

Figure 1:
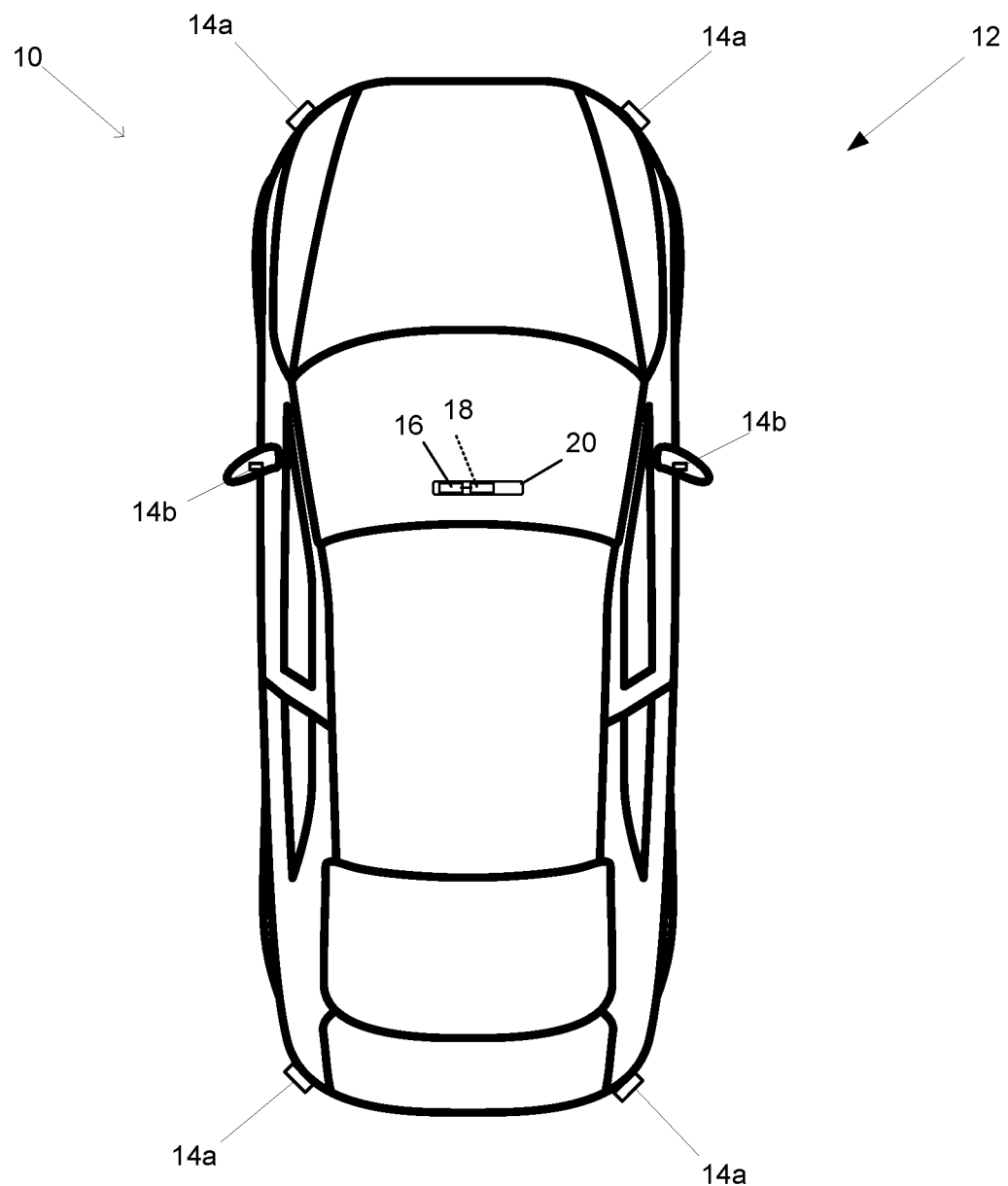
FIG. 1 is a plan view of a vehicle with a sensing system that incorporates one or more radar sensors.

Referring now to the drawings and the illustrative embodiments depicted therein, a sensing system 10 for a vehicle 12 includes at least one exterior viewing sensor, such as a radar sensor, which may be disposed, for example, at one or both side mirrors 14b of the vehicle and/or at one or more corners 14a of the vehicle (e.g., at a corner of a bumper). The radar sensor(s) capture sensor data representative of the scene occurring around the vehicle (FIG. 1). The sensing system 10 includes a control or electronic control unit (ECU) having electronic circuitry and associated software, with the electronic circuitry including a data processor or image processor that is operable to process sensor data captured by the radar sensors or other sensors (e.g., lidar, ultrasonic, cameras, etc.), whereby the ECU may detect or determine presence of objects or the like and alert an occupant of the vehicle and/or control movement of the vehicle. The data transfer or signal communication from the sensor to the ECU may comprise any suitable data or communication link, such as a vehicle network bus or the like of the equipped vehicle.

When performing a parking maneuver, such in a home garage, a parking garage, or a parking lot, etc., the side mirrors of the vehicle (i.e., the driver side mirror and/or the passenger side mirror) are often at an increased risk of damage. A side mirror of the vehicle may impact/collide with an object (e.g., a pole or another vehicle) when pulling into or exiting a parking space. For example, when pulling into a parking space, the driver may choose a poor turning radius and drive too close to a parking structure or other vehicle, causing a side mirror to impact with the pole or other vehicle, thereby causing significant damage to the side mirror and/or the other object. When exiting a parking space (e.g., a garage, a two-car parking space, or any other narrow parking space), the side mirrors are again at risk due to an incorrect turning radius. Modern side mirrors, due to electronics and other features, are often quite expensive, and thus damage to the side mirrors can cause a significant financial burden for the vehicle owner. Additionally, the vehicle can be less safe to operate until the mirrors are repaired/replaced.

Figure 2:
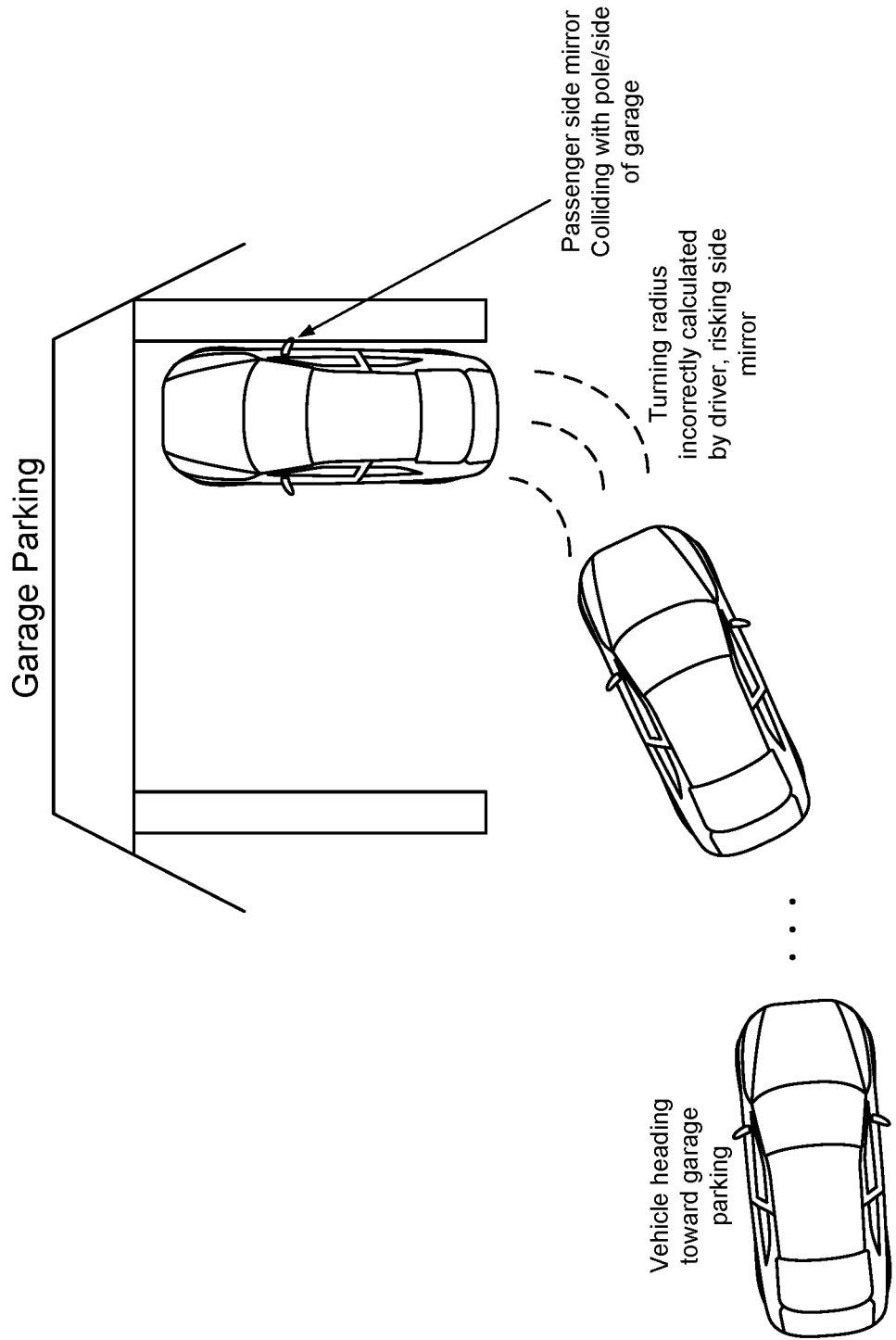
FIG. 2 is a schematic view of a vehicle parking in a parking garage.
Figure 3:
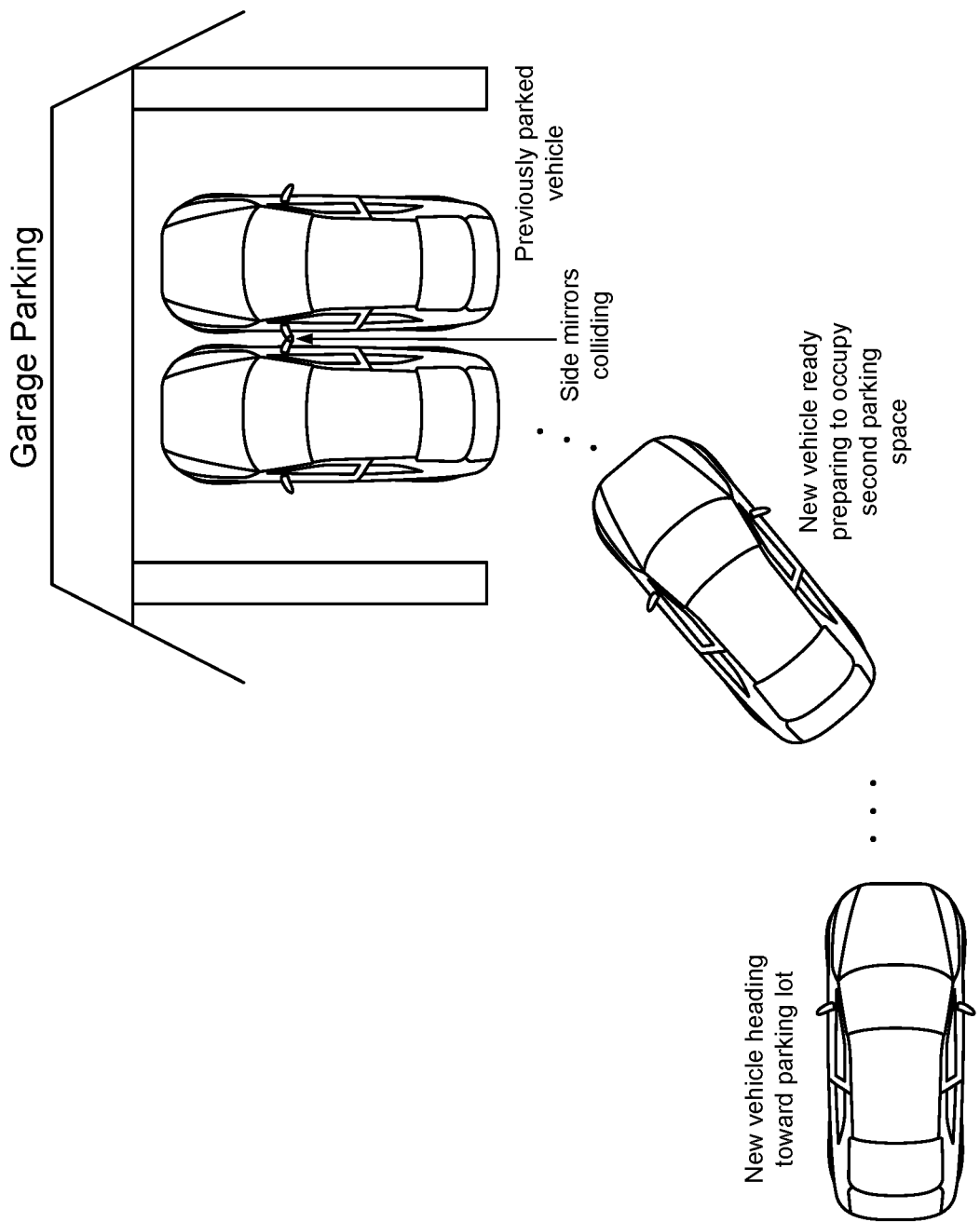
FIG. 3 is a schematic view of a vehicle parking next to another vehicle.
Figure 4:
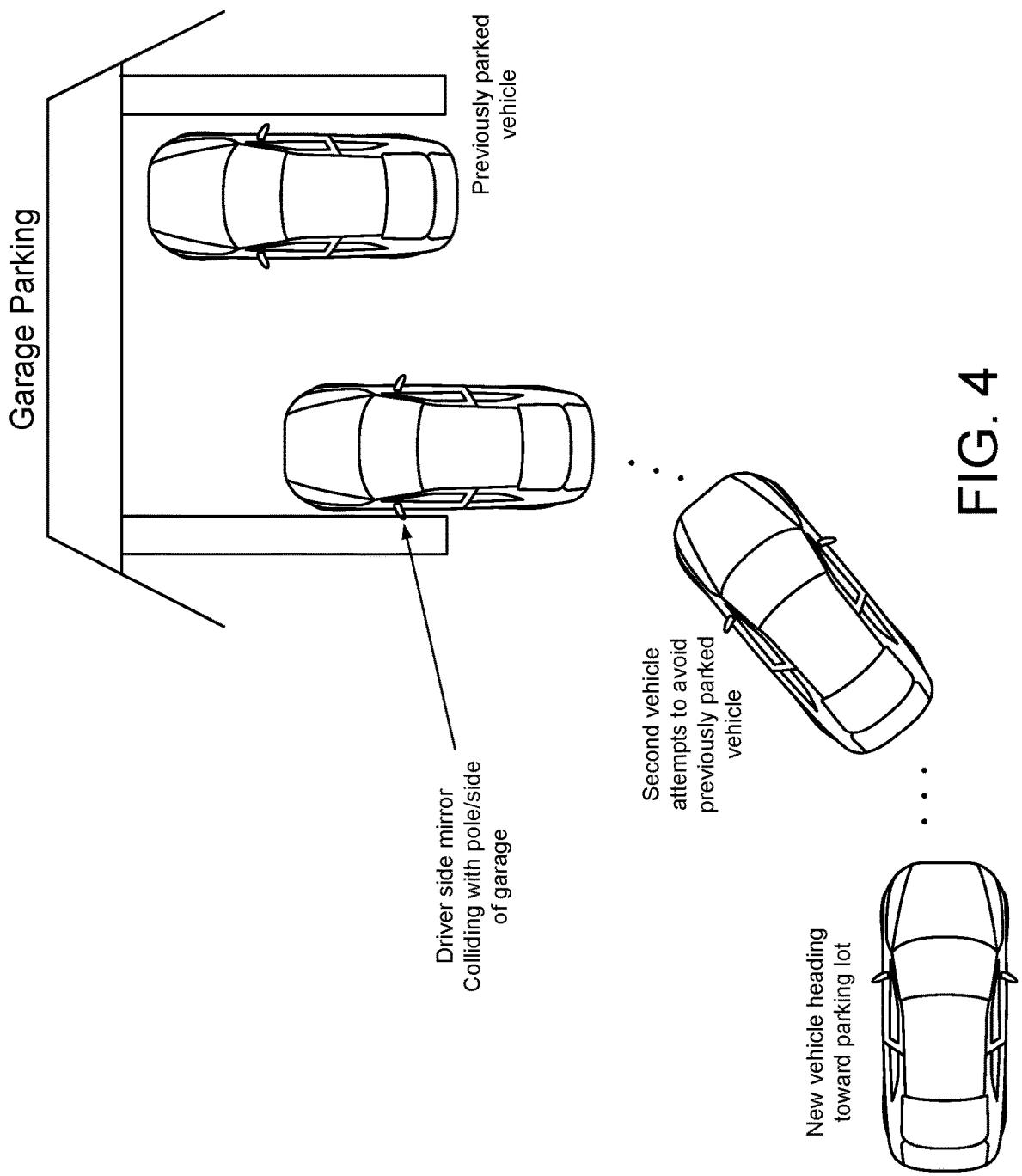
FIG. 4 is a schematic view of another vehicle parking in a parking garage.

In FIG. 2, a garage pole or other support structure (e.g., a pillar or a wall) of a parking garage is at an entry of a parking space. In this exemplary scenario, a vehicle may miscalculate the turning angle into the parking space (e.g., not turn sharply enough) and one of the side mirrors may be damaged by the pillar. In this example, the passenger side mirror collides with the object, thus damaging the passenger side mirror. In FIG. 3, another exemplary vehicle enters a parking area that is already occupied by a previously parked vehicle. Here, the vehicle pulls into a parking space next to the previously parked vehicle and the side mirrors of each vehicle collide, causing damage. The driver may park too close to the previously parked vehicle as a result of attempting to avoid support structures or other objects within the parking area. FIG. 4 exemplifies a vehicle entering a parking space and, while attempting to avoid a previously parked vehicle, damaging a driver side mirror on a pillar or other support structure while entering the parking space. In other examples, a side mirror of the vehicle is damaged while exiting a parking space/area during similar scenarios (e.g., by the driver incorrectly turning the vehicle while exiting the parking space).

Some vehicles include features such as auto-lock side mirror folding systems. These systems fold in or retract the side mirrors from an extended or operational position to a folded position when the vehicle is locked and fold out or extend the side mirrors when the vehicle is unlocked or started. These conventional systems are not capable of folding the mirror while driving the vehicle, and thus do not protect the side mirrors from the damage described above (i.e., damage caused when the equipped vehicle is moving).

Implementations herein include a sensing system that incorporates, for example, one or more radar sensors at a vehicle (e.g., one or more radar sensors 14a, 14b) to detect objects that may collide with the driver side mirror and/or the passenger side mirror of the vehicle. The radar sensors may be located at one or both side mirrors (e.g., disposed at least partially within a housing of the side mirrors). Additionally or alternatively, the radar sensors may be located at a front/rear/corners of the vehicle, such as each corner of the vehicle (e.g., at the bumpers). When the system determines, via processing sensor data captured by the radar sensor(s), that an object (e.g., another vehicle, a parking structure, etc.) may collide with one of the side mirrors (e.g., a likelihood of collision exceeds a threshold likelihood), the system may provide a warning or alert to the driver of the vehicle. For example, the vehicle predicts a path or route of the vehicle (e.g., based on current speed, acceleration, and steering commands of the vehicle) and determines whether any objects are within a threshold distance of the vehicle along the predicted path. The alert may be visual (e.g., at one or more displays of the vehicle, such as a cluster display or a head-up display) or audible (e.g., a chime or other sound played via speakers of the vehicle) or haptic (e.g., vibrate a steering wheel or a seat of the vehicle). Optionally, the system may automatically fold or retract the side mirrors of the vehicle to avoid or minimize a collision (with or without a complementary alert or notification). For example, the system may operate a powerfold actuator of the mirror assembly to fold the mirror head of the mirror assembly from an extended or use position (where the mirror reflective element provides a rearward view to the driver of the vehicle) toward the side of the vehicle at which the mirror assembly is mounted (where the mirror reflective element is generally facing or alongside the side of the vehicle). Optionally, the system may apply the brake of the vehicle to otherwise slow or stop the vehicle to avoid or minimize a potential collision.

The ECU software may be tuned and configured such that the system is only operational during parking maneuvers (e.g., in garages or narrow spaces). For example, the system may only be operational when location data (e.g., from a GPS sensor) determines that the vehicle may be parking (i.e., because the vehicle is near or within a known parking area). Additionally or alternatively, the system may only be operational when the vehicle is traveling below a threshold speed and/or when the vehicle has been started and/or placed in gear within a threshold period of time. Other means of determining a parking maneuver may also be used, such as via communications (e.g., via BLUETOOTH, WIFI, cellular, or any other wireless communication protocols) with another vehicle and/or external parking control system, processing image data captured by one or more cameras, etc. The sensors may feed or communicate or provide data to the ECU during other driving maneuvers (e.g., for adaptive cruise control, automatic emergency braking, lane keeping, etc.), but the sensor data may be processed at the ECU for the radar-based exterior mirror collision avoidance system only during parking maneuvers (e.g., when the system determines that a likelihood that the vehicle is parking exceeds a threshold value). In other words, the system does not operate the powerfold actuator of the mirror assembly when the vehicle is being driven along a road (such as at a speed greater than a threshold speed or the like). Thus, the system does not adjust the mirrors or apply the brakes during regular driving for safety purposes. The driver may be able to configure operation of the automatic mirror folding system and/or the automatic braking system (e.g., by enabling/disabling the system, configuring thresholds, etc.). The system may use any radar sensor, such as one or more AWR1843 radar sensors.

Figure 5:
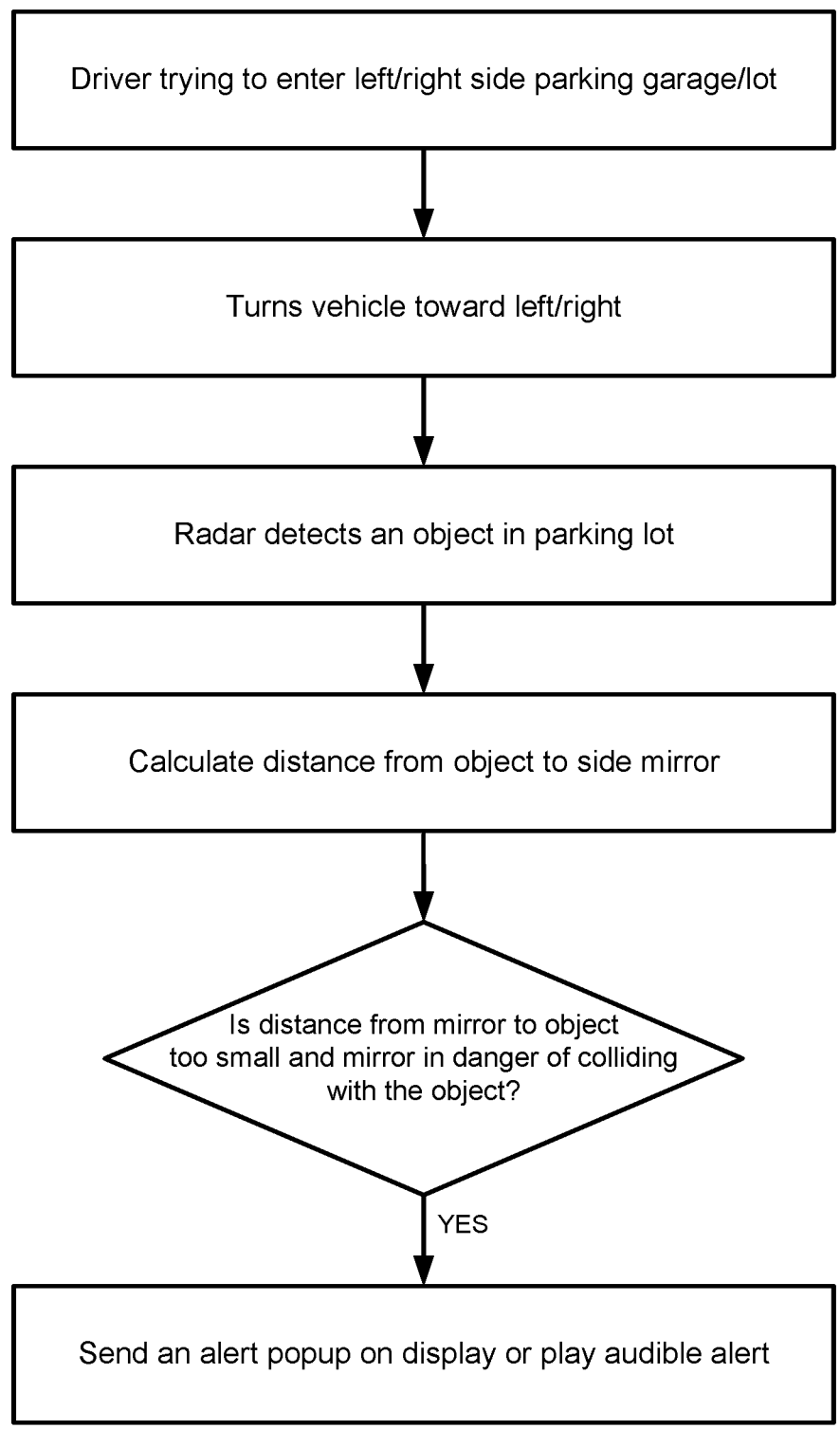
FIGS. 5-13 are exemplary flow diagrams for various parking scenarios for the sensing system of FIG. 1.
Figure 6:
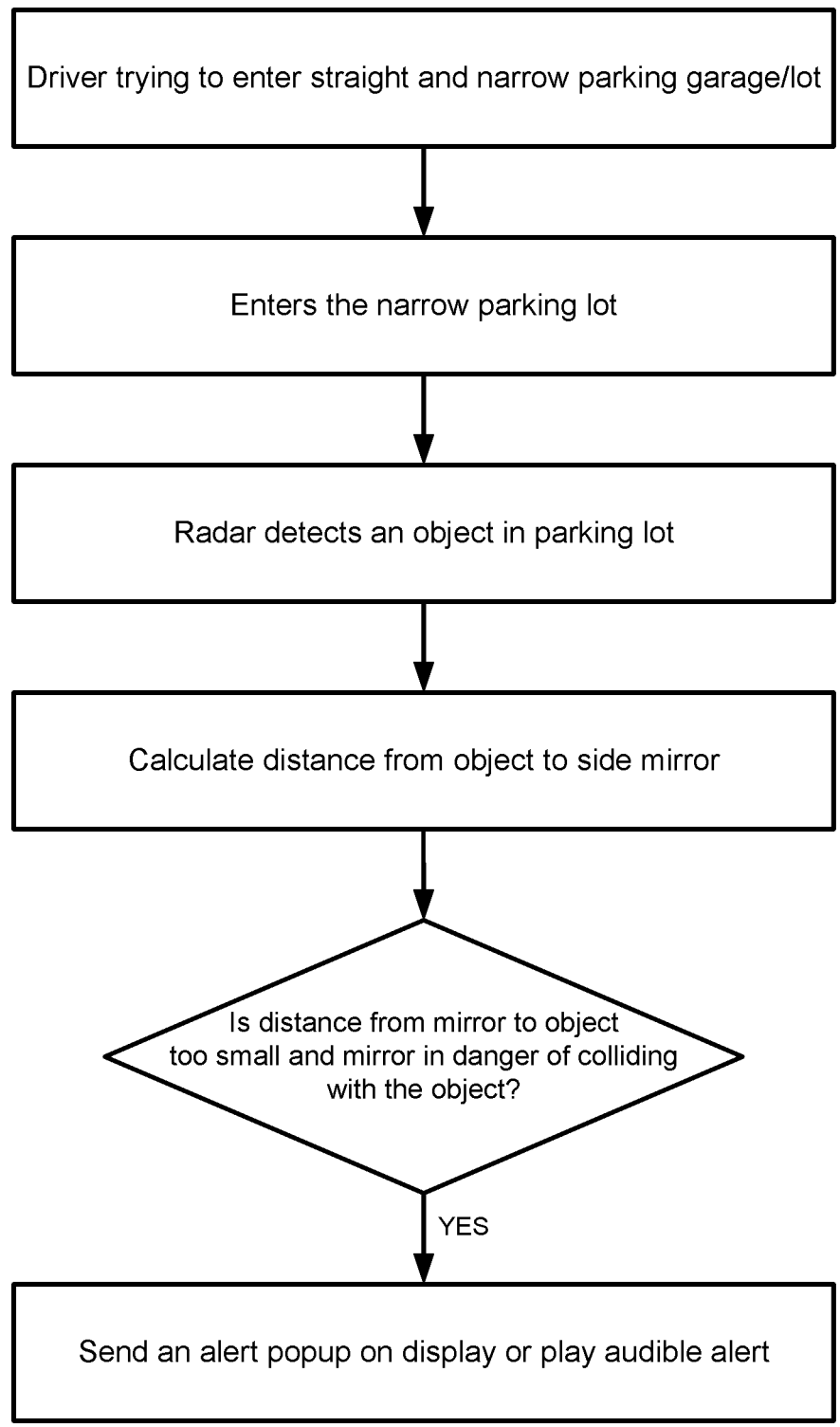
Figure 7:
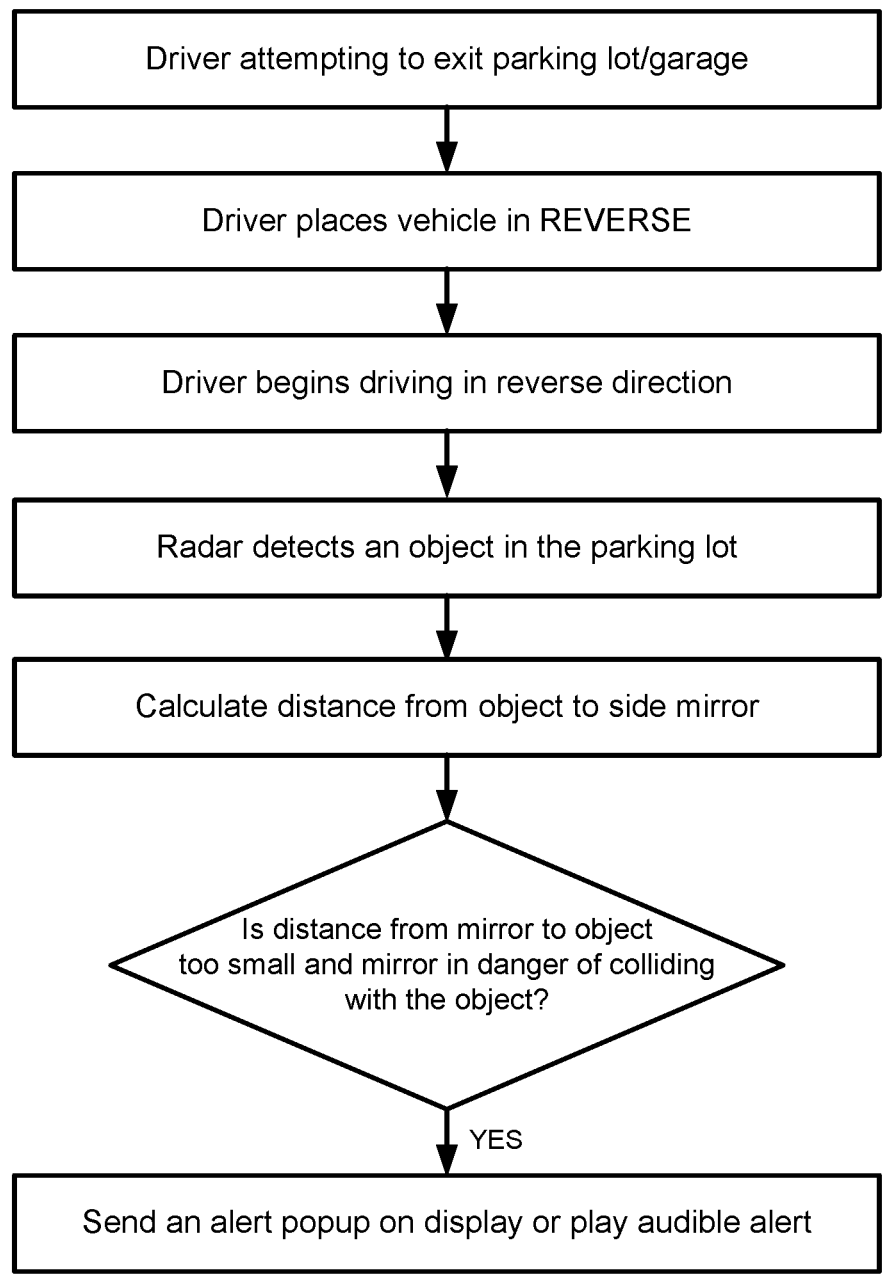
Figure 8:
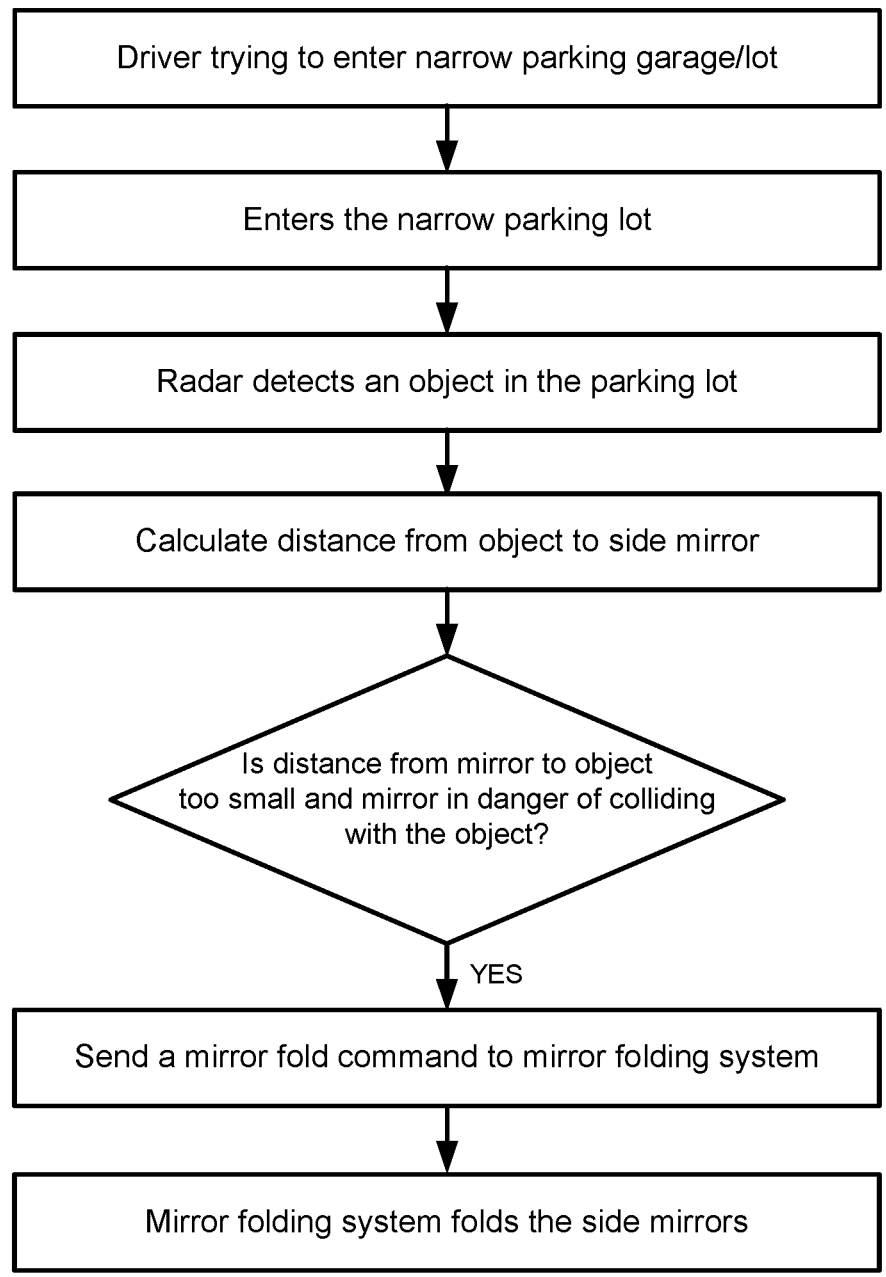
Figure 9:
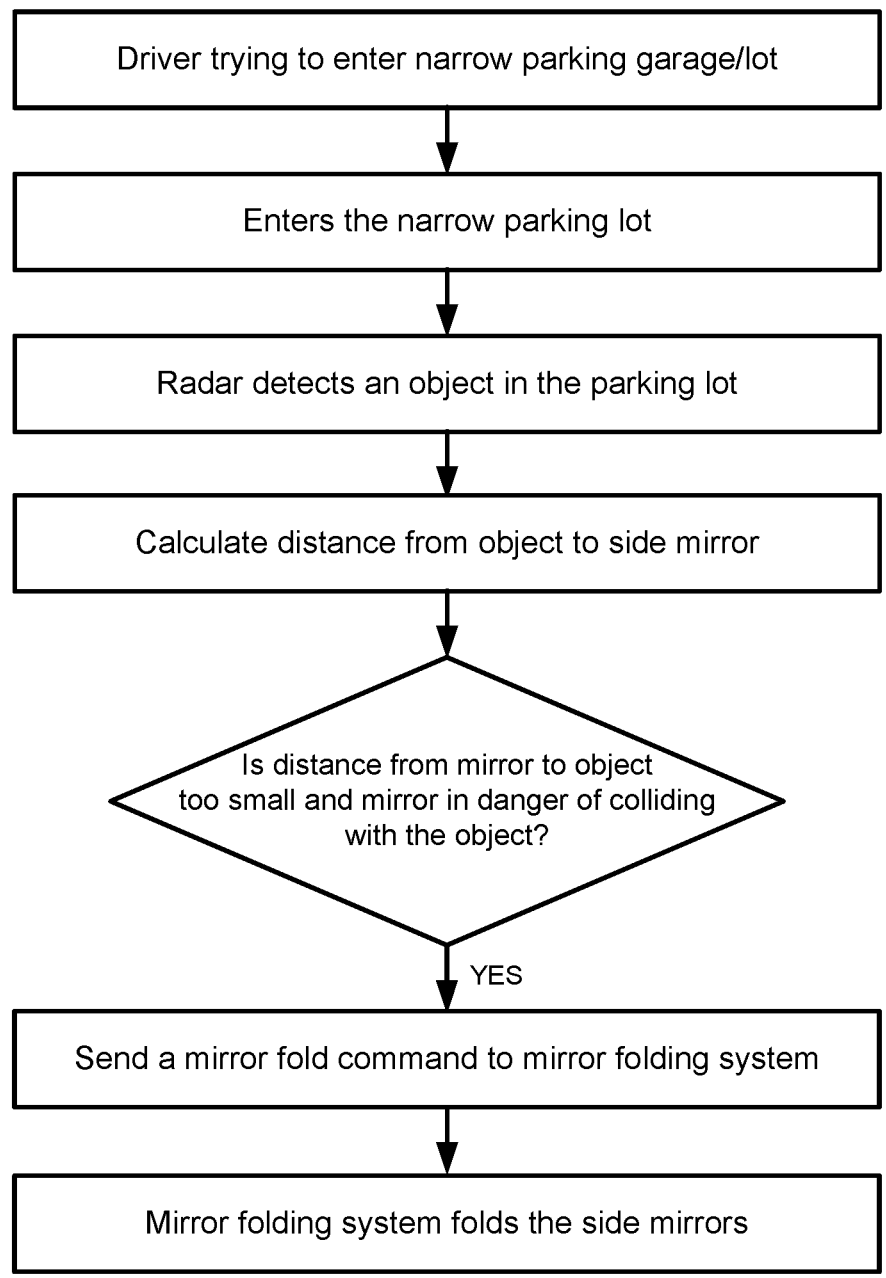
Figure 10:
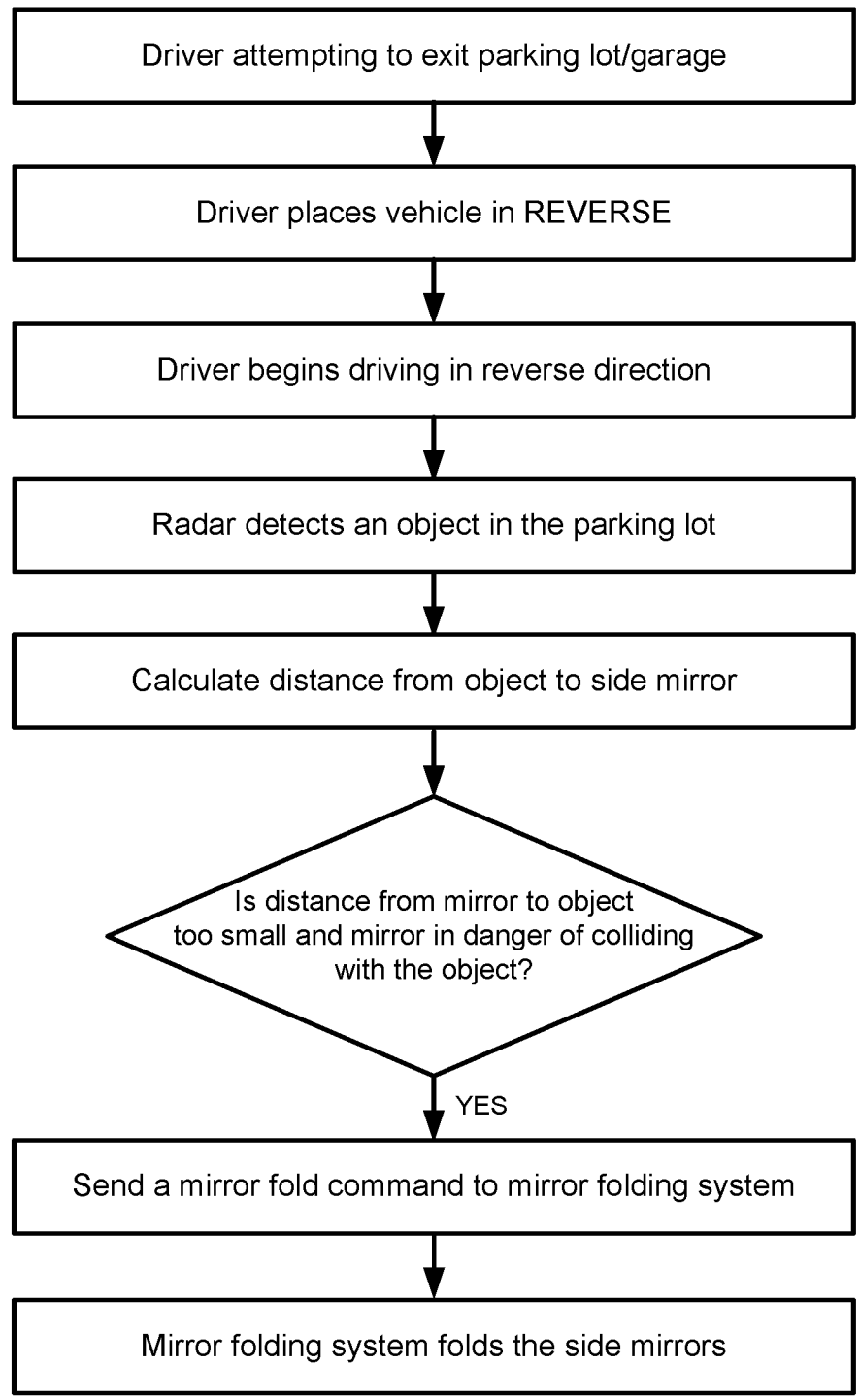
Figure 11:
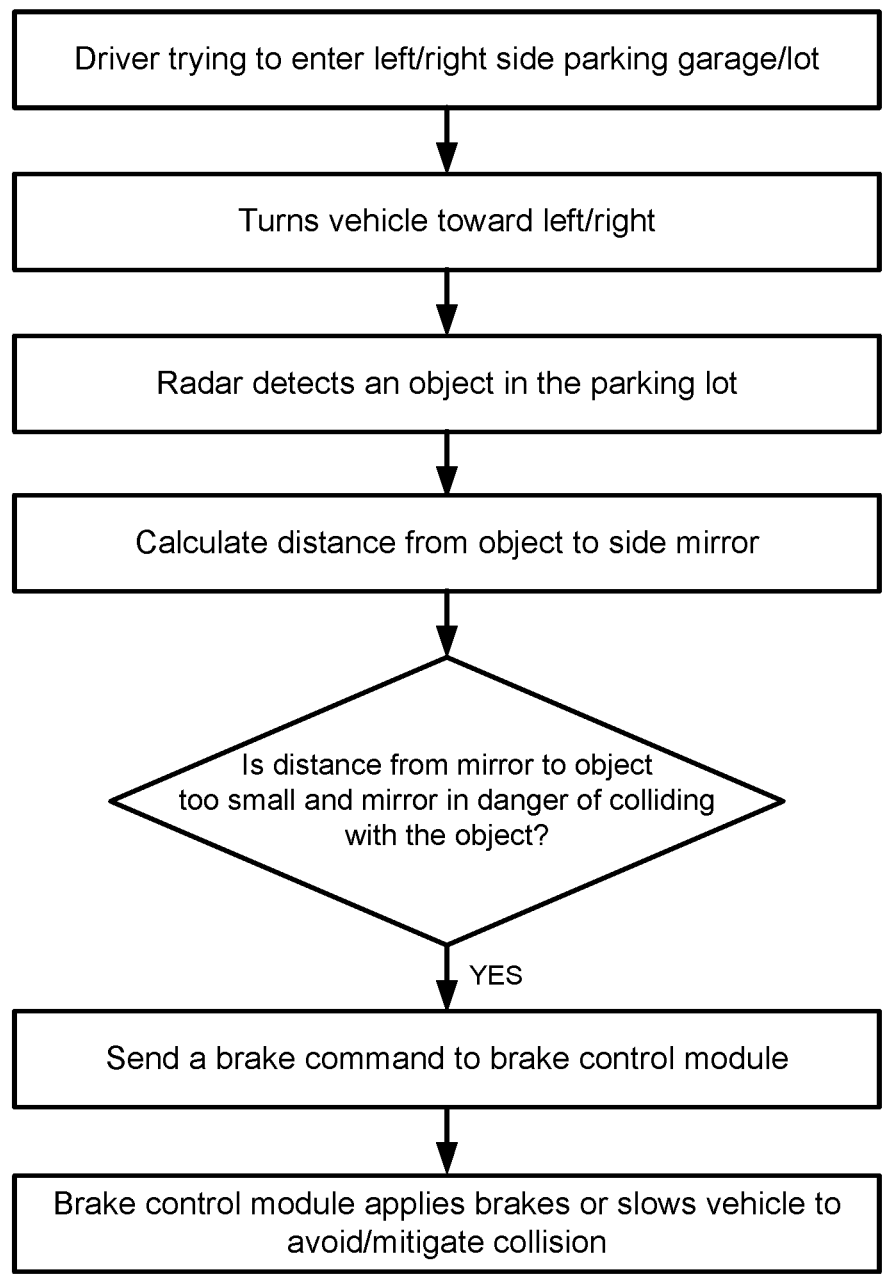
Figure 12:
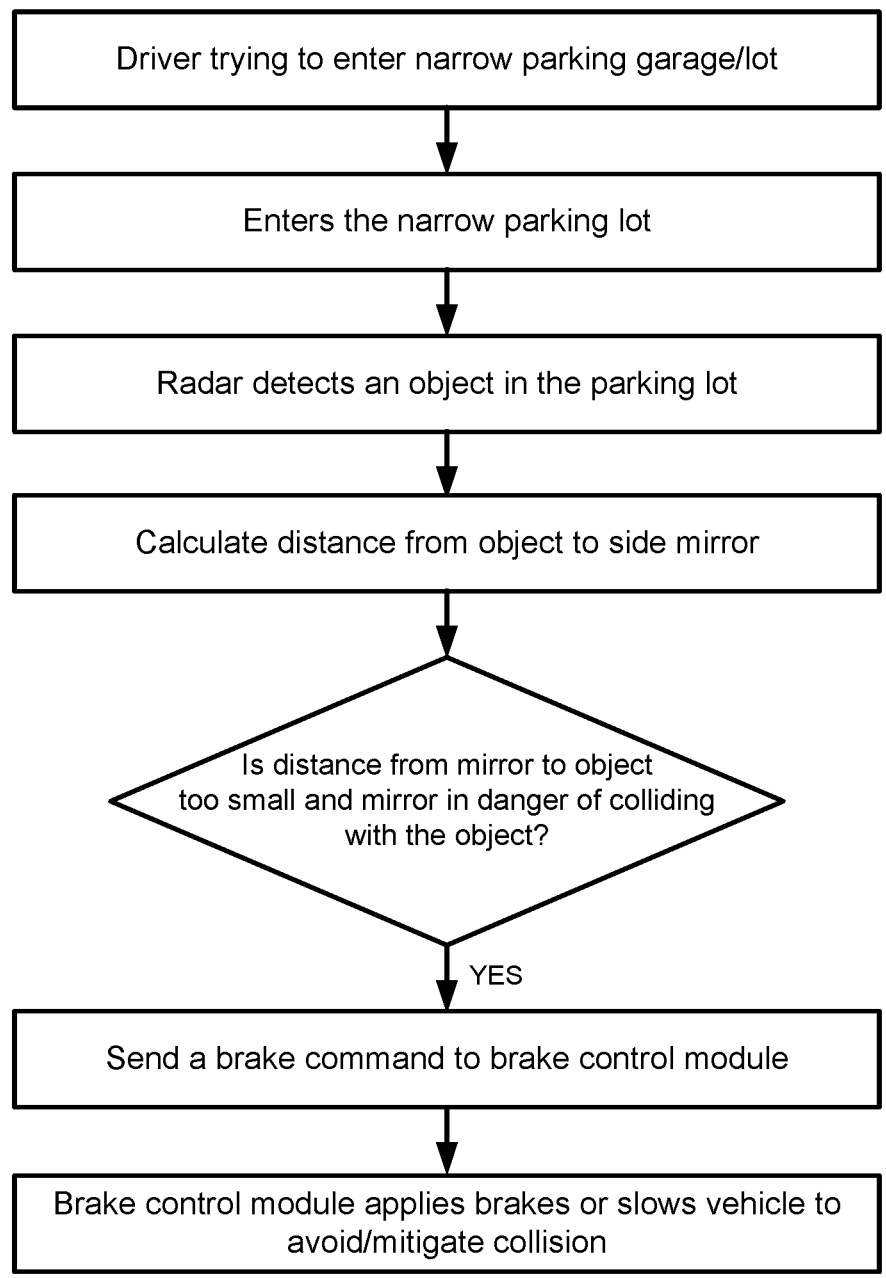
Figure 13:
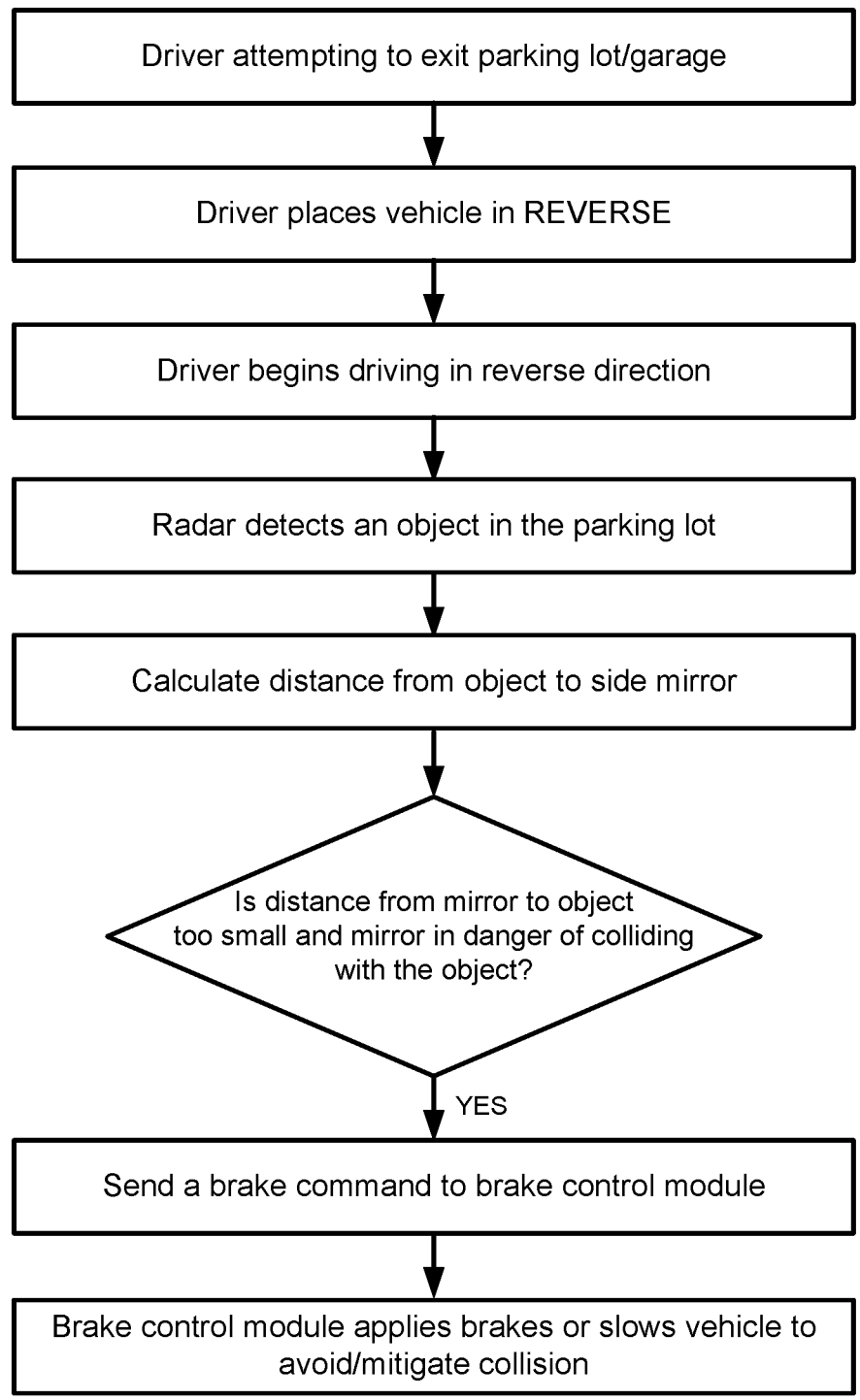

FIG. 5 is an exemplary flow diagram for the system when a vehicle enters a parking lot from the left or right with a system that is not equipped with or does not have enabled an automatic mirror folding system or automatic braking system. In this example, the system generates an alert (e.g., a visual alert, an audible alert, and/or a haptic alert) to the driver indicating the potential collision. FIG. 6 is an exemplary flow diagram for a similar system when entering a narrow parking lot straight with a system that is not equipped with or does not have enabled an automatic mirror folding system or automatic braking system. In this example, the system generates an alert (e.g., a visual alert, an audible alert, and/or a haptic alert) to the driver indicating the potential collision. FIG. 7 is an exemplary flow diagram for the system when a vehicle is exiting a parking lot when the vehicle is not equipped with or does not have enabled an automatic mirror folding system or automatic braking system and the system generates similar alerts. FIG. 8 is an exemplary flow diagram for the system when a vehicle enters a parking lot from the left or right and the vehicle is equipped and has a mirror folding system enabled. Here, in addition to or alternatively to an alert, the system automatically folds the mirrors to position the mirror heads of the mirror assembly or assemblies toward and along the side of the vehicle to avoid a collision. FIG. 9 is an exemplary flow diagram for the system when a vehicle enters a parking lot straight and the vehicle has a mirror folding system equipped and enabled. FIG. 10 is an exemplary flow diagram for the system when a vehicle exits a parking lot and the vehicle has a mirror folding system equipped and enabled. FIG. 11 is an exemplary flow diagram for the system when a vehicle enters a parking lot from the left or right and the vehicle is equipped with and has enabled an automatic braking system. Here, in addition to or alternatively to an alert, the system automatically slows the vehicle to avoid or mitigate a potential collision. FIG. 12 is an exemplary flow diagram for the system when a vehicle enters a parking lot from straight in a vehicle that is equipped with an automatic braking system. FIG. 13 is an exemplary flow diagram for the system when a vehicle exits a parking lot and the vehicle is equipped with an automatic braking system.

Thus the sensing system described herein includes one or more sensors, such as radar sensors at a side mirror or a corner of the vehicle, to detect objects that may collide with a side mirror of the vehicle during a parking maneuver. When an object that may collide with the vehicle is detected during a parking maneuver, the system may warn the driver, automatically fold the mirrors, and/or slow the vehicle. While examples herein describe the system working with radar sensors, additionally or alternatively, other sensors may be included. For example, the system may include lidar, ultrasonic sensors, cameras, etc.

The system may utilize sensors, such as radar sensors or imaging radar sensors or lidar sensors or the like, to detect presence of and/or range to objects and/or other vehicles and/or pedestrians. The sensing system may utilize aspects of the systems described in U.S. Pat. Nos. 10,866,306; 9,954,955; 9,869,762; 9,753,121; 9,689,967; 9,599,702; 9,575,160; 9,146,898; 9,036,026; 8,027,029; 8,013,780; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 7,053,357; 6,919,549; 6,906,793; 6,876,775; 6,710,770; 6,690,354; 6,678,039; 6,674,895 and/or 6,587,186, and/or U.S. Publication Nos. US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controls at least one function or feature of the vehicle (such as to provide autonomous driving control of the vehicle) responsive to processing of the data captured by the radar sensors.

The system may utilize aspects of the parking assist systems described in U.S. Pat. No. 8,874,317 and/or U.S. Publication Nos. US-2017-0329346; US-2017-0317748; US-2017-0253237; US-2017-0050672; US-2017-0017848; US-2017-0015312 and/or US-2015-0344028, which are hereby incorporated herein by reference in their entireties.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
    at least one radar sensor disposed at a vehicle equipped with the vehicular sensing system and sensing exterior of the vehicle, the at least one radar sensor capturing radar data;
    an electronic control unit (ECU) comprising electronic circuitry and associated software;
    wherein the electronic circuitry of the ECU comprises a data processor for processing radar data captured by the at least one radar sensor;
    wherein, during a parking maneuver of the equipped vehicle, radar data captured by the at least one radar sensor is processed at the ECU to detect an object present exterior of the vehicle;
    wherein, during the parking maneuver, the vehicular sensing system, responsive to processing by the data processor of radar data captured by the at least one radar sensor, determines that the detected object is within a threshold distance of a predicted path of an exterior side mirror assembly at a side of the vehicle;

wherein, during the parking maneuver, the vehicular sensing system, responsive to determining the object is within the threshold distance of the predicted path of the exterior side mirror assembly of the vehicle, automatically folds the exterior side mirror assembly toward the side of the vehicle at which the exterior side mirror assembly is mounted; and wherein the vehicular sensing system, responsive to determining that the vehicle is not performing any parking maneuver, disables automatic folding of the exterior side mirror assembly.

2. The vehicular sensing system of claim 1, wherein the vehicular sensing system, responsive to determining that the detected object is within the threshold distance of the predicted path of the exterior side mirror assembly of the vehicle, provides an alert to the driver of the vehicle.

3. The vehicular sensing system of claim 2, wherein the alert comprises a visual alert and an audible alert.

4. The vehicular sensing system of claim 1, wherein the vehicular sensing system, responsive to determining that the detected object is within the threshold distance of the predicted path of the exterior side mirror assembly of the vehicle, automatically slows the vehicle.

5. The vehicular sensing system of claim 1, wherein the exterior side mirror assembly comprises an exterior driver side mirror assembly of the vehicle.

6. The vehicular sensing system of claim 1, wherein the exterior side mirror assembly comprises an exterior passenger side mirror assembly of the vehicle.

7. The vehicular sensing system of claim 1, wherein the detected object comprises a side mirror of another vehicle.

8. The vehicular sensing system of claim 1, wherein the detected object comprises a parking structure.

9. The vehicular sensing system of claim 1, wherein the parking maneuver comprises the equipped vehicle entering a parking space.

10. The vehicular sensing system of claim 1, wherein the parking maneuver comprises the equipped vehicle leaving a parking space.

11. A vehicular sensing system, the vehicular sensing system comprising:
at least one radar sensor disposed at a vehicle equipped with the vehicular sensing system and sensing exterior of the vehicle, the at least one radar sensor capturing radar data;
an electronic control unit (ECU) comprising electronic circuitry and associated software;
wherein the electronic circuitry of the ECU comprises a data processor for processing radar data captured by the at least one radar sensor;
wherein, during a parking maneuver of the equipped vehicle, radar data captured by the at least one radar sensor is processed at the ECU to detect an object present exterior of the vehicle;
wherein, during the parking maneuver, the vehicular sensing system, responsive to processing by the data processor of radar data captured by the at least one radar sensor, determines that the detected object is within a threshold distance of a predicted path of an exterior side mirror assembly at a side of the vehicle;
wherein, during the parking maneuver, the vehicular sensing system, responsive to determining the object is within the threshold distance of the predicted path of the exterior side mirror assembly of the vehicle, (i) automatically folds the exterior side mirror assembly toward the side of the vehicle at which the exterior side mirror assembly is mounted, (ii) automatically slows the vehicle, and (iii) provides an alert to the driver of the vehicle; and wherein the vehicular sensing system, responsive to determining that the vehicle is not performing any parking maneuver, disables automatic folding of the exterior side mirror assembly.

12. The vehicular sensing system of claim 11, wherein the alert comprises a visual alert and an audible alert.

13. The vehicular sensing system of claim 11, wherein the exterior side mirror assembly comprises an exterior driver side mirror assembly of the vehicle.

14. The vehicular sensing system of claim 11, wherein the exterior side mirror assembly comprises an exterior passenger side mirror assembly of the vehicle.

15. The vehicular sensing system of claim 11, wherein the detected object comprises a side mirror of another vehicle.

16. The vehicular sensing system of claim 11, wherein the detected object comprises a parking structure.

17. A vehicular sensing system, the vehicular sensing system comprising:
at least one radar sensor disposed at an exterior side mirror assembly of a vehicle equipped with the vehicular sensing system and sensing exterior of the vehicle, the at least one radar sensor capturing radar data;
an electronic control unit (ECU) comprising electronic circuitry and associated software;
wherein the electronic circuitry of the ECU comprises a data processor for processing radar data captured by the at least one radar sensor;
wherein, during a parking maneuver of the equipped vehicle, radar data captured by the at least one radar sensor is processed at the ECU to detect an object present exterior of the vehicle;
wherein, during the parking maneuver, the vehicular sensing system, responsive to processing by the data processor of radar data captured by the at least one radar sensor, determines that the detected object is within a threshold distance of a predicted path of the exterior side mirror assembly at a side of the vehicle;
wherein, during the parking maneuver, the vehicular sensing system, responsive to determining the object is within the threshold distance of the predicted path of the exterior side mirror assembly of the vehicle, automatically folds the exterior side mirror assembly toward the side of the vehicle at which the exterior side mirror assembly is mounted; and
wherein the vehicular sensing system, responsive to determining that the vehicle is not performing any parking maneuver, disables automatic folding of the exterior side mirror assembly.

18. The vehicular sensing system of claim 17, wherein the exterior side mirror assembly comprises an exterior driver side mirror assembly of the vehicle.

19. The vehicular sensing system of claim 17, wherein the exterior side mirror assembly comprises an exterior passenger side mirror assembly of the vehicle.

\* \* \* \* \*